US010571882B2

(12) United States Patent
Abe

(10) Patent No.: US 10,571,882 B2
(45) Date of Patent: Feb. 25, 2020

(54) CONTROLLER

(71) Applicant: FANUC CORPORATION, Yamanashi (JP)

(72) Inventor: Hiroshi Abe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 65 days.

(21) Appl. No.: 15/830,340

(22) Filed: Dec. 4, 2017

(65) Prior Publication Data
US 2018/0173185 A1 Jun. 21, 2018

(30) Foreign Application Priority Data
Dec. 19, 2016 (JP) ................... 2016-245548

(51) Int. Cl.
*G11C 7/00* (2006.01)
*G06F 17/30* (2006.01)
(Continued)

(52) U.S. Cl.
CPC ........ *G05B 19/0428* (2013.01); *B25J 9/1674* (2013.01); *B25J 13/06* (2013.01);
(Continued)

(58) Field of Classification Search
CPC ...... G05B 19/0428; G05B 2219/24024; G05B 2219/24162; B25J 9/1674; B25J 13/06; B25J 13/08; G06K 9/00013
(Continued)

(56) References Cited

U.S. PATENT DOCUMENTS 6,931,300 B2   8/2005 Yamazaki et al.
9,563,761 B1 * 2/2017 Ziraknejad ............. G06F 21/32
(Continued)

FOREIGN PATENT DOCUMENTS

CN   102478806   5/2012
DE   602 17 597   10/2007
(Continued)

OTHER PUBLICATIONS

Yuxin Meng; Touch Gestures Based Biometric Authentication Scheme for Touchscreen Mobile Phones; Citeseer;Sep. 18, 2016; p. 1-21 (Year: 2016).*
(Continued)

*Primary Examiner* — Monjur Rahim
(74) *Attorney, Agent, or Firm* — Wenderoth, Lind & Ponack, L.L.P.

(57) ABSTRACT

To provide a controller for reducing a burden to be imposed on an operator in applying force with a finger during operation on a machine tool or a robot, and for associating an operation history with identification information about the operator. A controller for a robot or a machine tool comprises a fingerprint detection unit and a control unit. The control unit comprises: a key information receiving part that receives input key information; a key information transmission part that transmits the input key information linked in advance with the fingerprint detection unit to the key information receiving part if an operator makes a finger touch the fingerprint detection unit; and an individual identification information specification part that specifies identification information about the operator based on fingerprint information about the finger having touched the fingerprint detection unit.

8 Claims, 9 Drawing Sheets

(51) Int. Cl.

| | | |
|---|---|---|
| *G06F 13/00* | (2006.01) | |
| *G06F 12/14* | (2006.01) | |
| *G06F 12/00* | (2006.01) | |
| *G06F 7/04* | (2006.01) | |
| *G05B 19/042* | (2006.01) | |
| *B25J 13/06* | (2006.01) | |
| *G06K 9/00* | (2006.01) | |
| *B25J 9/16* | (2006.01) | |
| *B25J 13/08* | (2006.01) | |

(52) U.S. Cl.
CPC ............ *B25J 13/08* (2013.01); *G05B 19/042* (2013.01); *G06K 9/00013* (2013.01); *G06K 9/00087* (2013.01); *G05B 2219/24024* (2013.01); *G05B 2219/24162* (2013.01)

(58) Field of Classification Search
USPC .......................................................... 726/17
See application file for complete search history.

(56) References Cited

U.S. PATENT DOCUMENTS

| | | |
|---|---|---|
| 2002/0031245 A1 | 3/2002 | Rozenberg et al. |
| 2004/0088066 A1 | 5/2004 | Yamazaki et al. |
| 2008/0033588 A1* | 2/2008 | Kubo ..................... G05B 15/02 700/108 |
| 2009/0183008 A1* | 7/2009 | Jobmann ............... H04L 9/0866 713/186 |
| 2014/0135984 A1 | 5/2014 | Hirata |
| 2018/0336330 A1* | 11/2018 | Yamamoto ............. G05B 23/02 |

FOREIGN PATENT DOCUMENTS

| | | |
|---|---|---|
| EP | 1 043 698 | 10/2000 |
| EP | 1 562 136 | 8/2005 |
| JP | 2004-94436 | 3/2004 |
| JP | 2004-167669 | 6/2004 |
| JP | 2004-243472 | 9/2004 |
| JP | 2005-103740 | 4/2005 |
| JP | 2008-152757 | 7/2008 |
| JP | 2010-198465 | 9/2010 |
| JP | 2014-94436 | 5/2014 |
| JP | 2015-520456 | 7/2015 |
| JP | 2015-215793 | 12/2015 |
| WO | 2013/173838 | 11/2013 |

OTHER PUBLICATIONS

Juggly.cn, Nov. 29, 2013, <URL: http://juggly.cn/archives/100991.html>, with English translation.
ITmediaMobile, Aug. 31, 2007, <URL: http://www.itmedia.co.jp/mobile/articles/0708/31/news118.html>, with English translation.
Office Action issued Aug. 2, 2019 in corresponding German Patent Application No. DE102017222211.5.

* cited by examiner

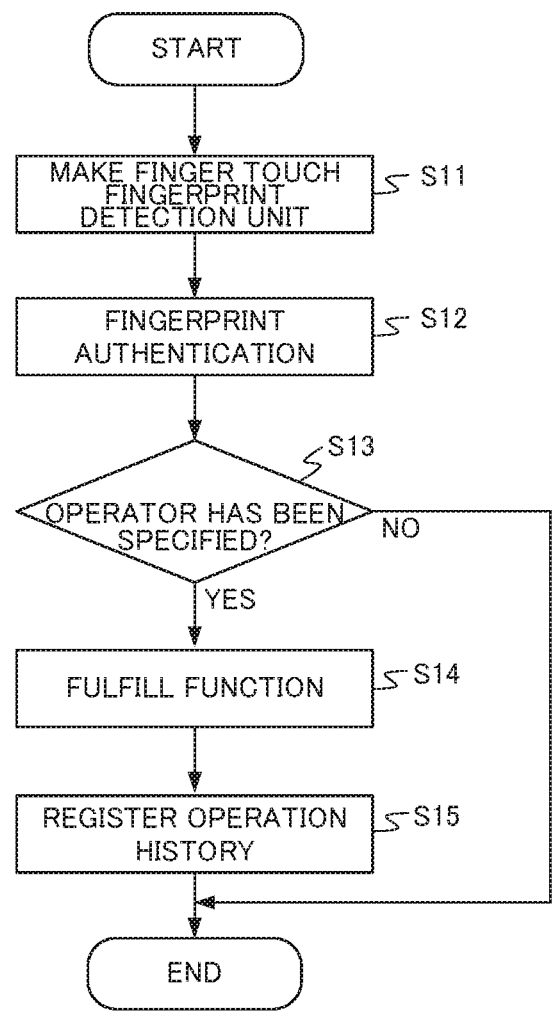

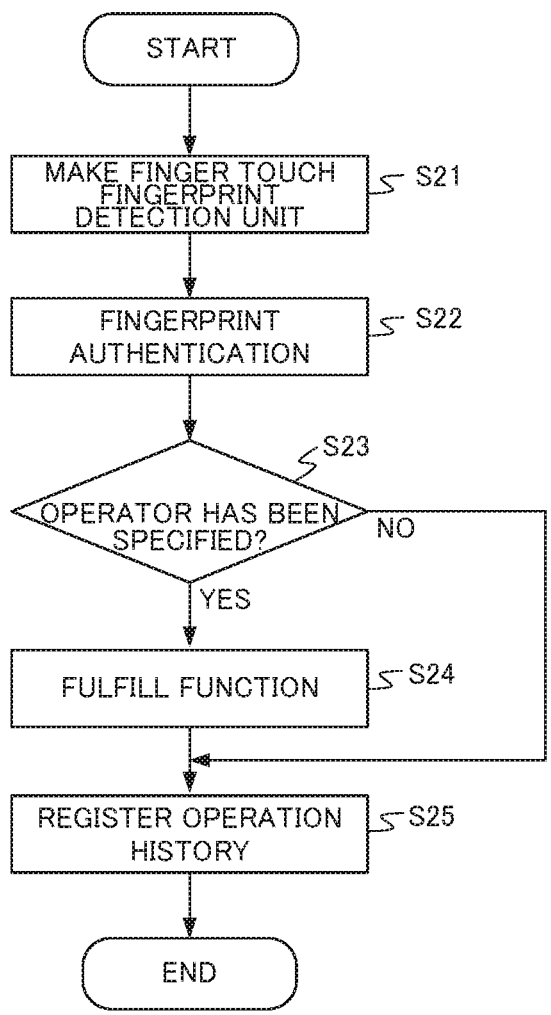

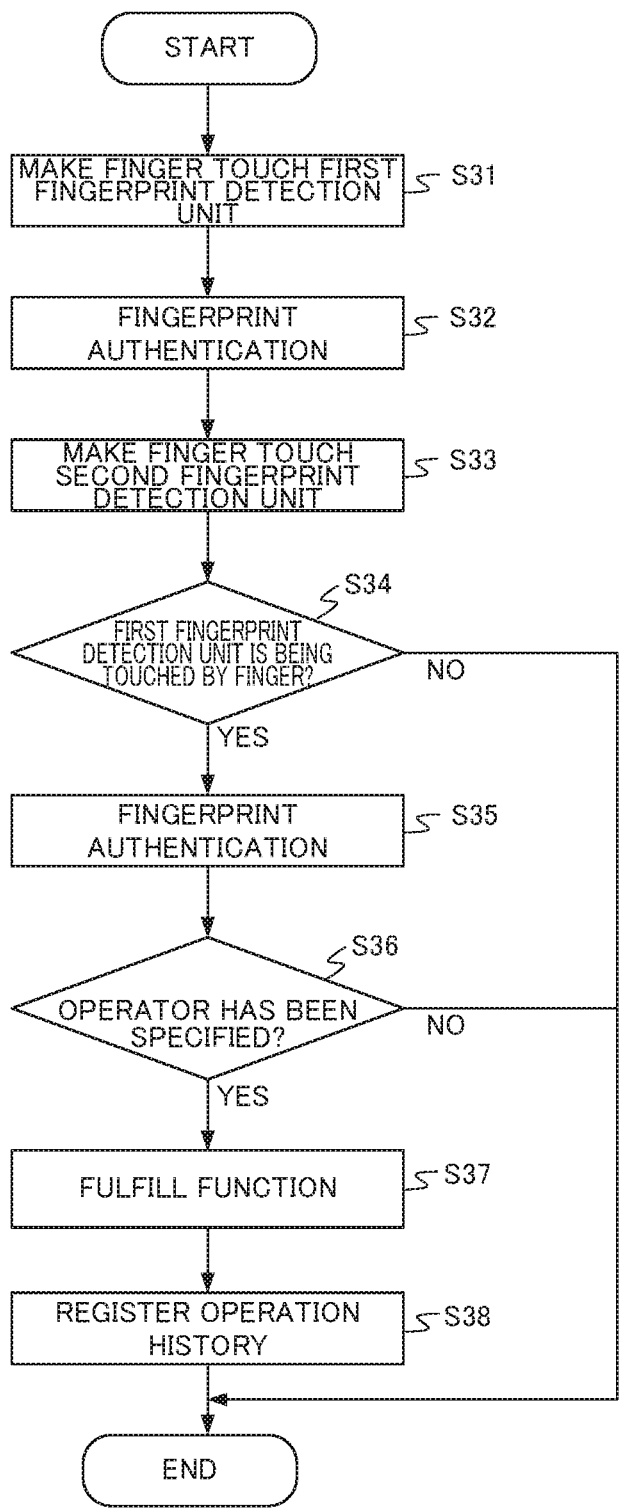

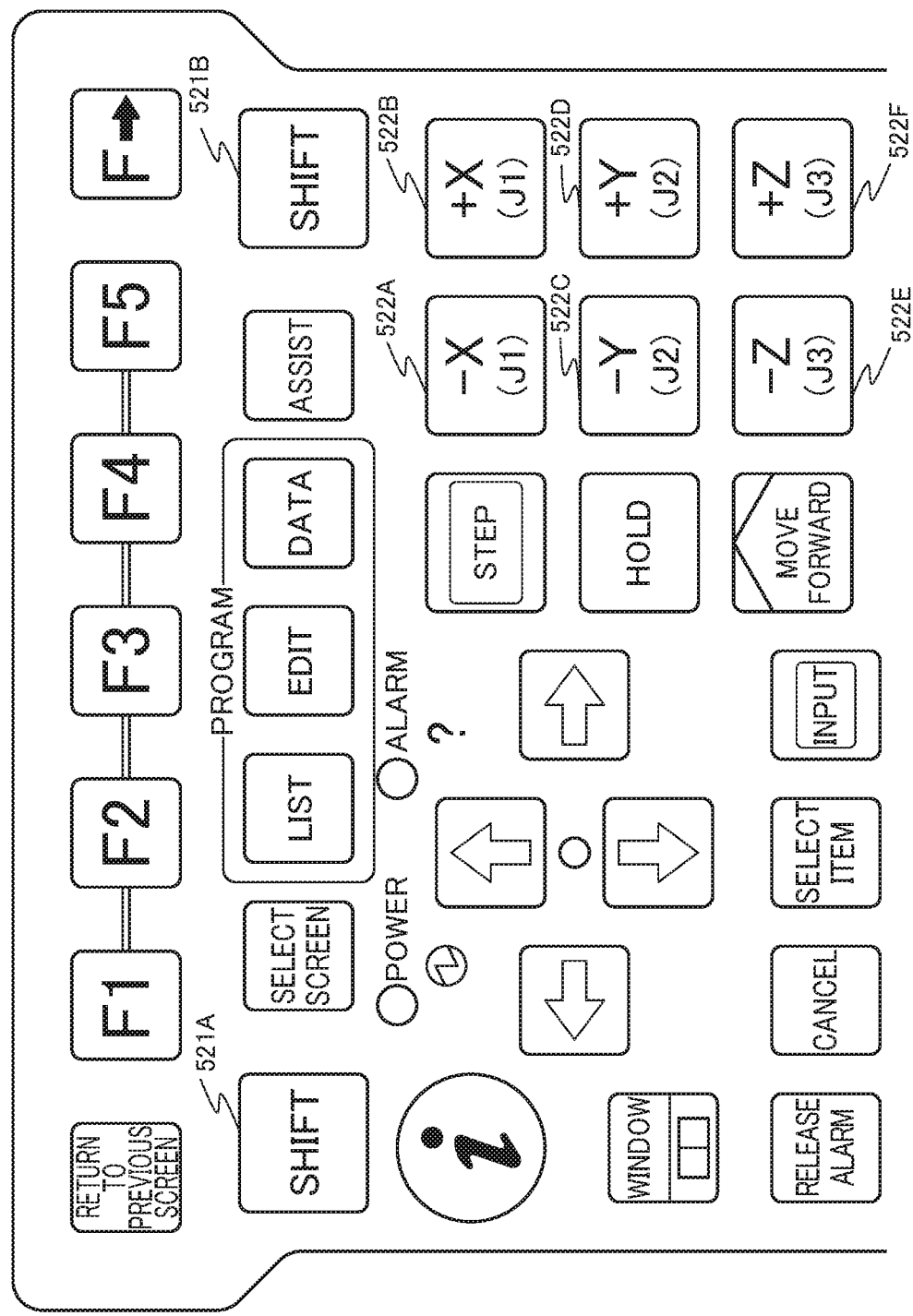

CONTROLLER

This application is based on and claims the benefit of priority from Japanese Patent Application No. 2016-245548, filed on 19 Dec. 2016, the content of which is incorporated herein by reference.

BACKGROUND OF THE INVENTION

Field of the Invention

The present invention relates to a controller, particularly to a controller for controlling a machine tool or a robot.

Related Art

According to a technique employed in a controller for controlling a machine tool or a robot, an operation history of a key at the controller is acquired and stored as log information useful in terms of security or as log information to be used for investigating a cause for trouble occurring in the machine tool or the robot. In a conventional operation history acquiring method, depression of a push button having a mechanical up and down mechanism or depressing pressure is detected and recorded. In addition, to specify an operator for acquisition of an operation history, an ID number is input or a card containing a registered ID number is read by a reader before operation. Then, the operation history and identification information about the operator are associated with each other.

However, it has been impossible to prevent disguise as a worker by the method of inputting an ID number or making a reader read a card containing a registered ID number before operation. More specifically, an actual situation has been such that, after input of an ID number by one operator or reading of a card containing a registered ID number by a reader, a different operator is permitted to operate a controller. Hence, a security level has been low.

In this regard, according to a robot system disclosed by patent document 1, an authentication device determines whether or not a worker is a legitimate worker. If the worker has been authenticated successfully, the details of work (details of practice) and working experience (years of practice) about the worker are acquired from information about the worker. The setting of a robot is changed in response to the acquired details of work (details of practice) and working experience (years of practice).

According to a controller for an industrial machine disclosed by patent document 2, it is determined whether or not a user is a registered person using biological information. If the user is determined to be a registered person, a selection is made for each operating condition for an industrial machine between a settable state and a non-settable state.

According to an industrial robot disclosed by patent document 3, an individual is identified using a fingerprint. A display screen on a display unit is changed in response to a result of the identification.

According to a technique disclosed by patent document 4, a fingerprint pattern is detected by sensing a fingerprint ridge of a finger having touched a touch sensitive screen on a display unit.

Non-patent document 1 discloses a sensor with a touch sensor and a fingerprint sensor integrated with each other.

According to a publicly-known technique disclosed by non-patent document 2, each pixel in a display unit has a built-in optical sensor. This optical sensor is used as a touch panel and also as a scanner for scanning a fingerprint.

Patent Document 1: Japanese Unexamined Patent Application, Publication No. 2014-094436
Patent Document 2: Japanese Unexamined Patent Application, Publication No. 2004-167669
Patent Document 3: Japanese Unexamined Patent Application, Publication No. 2004-094436
Patent Document 4: Japanese Unexamined Patent Application (Translation of PCT Application), Publication No. 2015-520456
Non-Patent Document 1: Juggly.cn "Era has come for fingerprint authentication on touch panel,"<URL: http://juggly.cn/archives/100991.html>
Non-Patent Document 2: ITmediaMobile "Using liquid crystal as scanner and as fingerprint sensor,"<URL: http://www.itmedia.co.jp/mobile/articles/0708/31/news118.html>

SUMMARY OF THE INVENTION

However, none of the documents is not to associate identification information about an operator with an operation history. Further, there has been the necessity to press a push-type key having a mechanical up and down mechanism during operation on a machine tool or a robot. This has imposed a burden on an operator in applying force with a finger for pressing the key. In some cases, a health hazard such as tenosynovitis has been caused.

FIGS. 8A and 8B show a controller 50 as a conventional example for controlling a machine tool. The controller 50 is an example of a generally-called teach-pendant controller. The controller 50 is used for operating a machine tool by remote control.

As shown in FIG. 8A, the controller 50 includes a display unit 51 and an operation unit 52. The operation unit 52 includes multiple protruding keys having an up and down mechanism. The display unit 51 displays an attribute value or a monitoring target value about a machine tool as an operation target, an input value used for operating the machine tool generated by depressing a key at the operation unit 52, etc. An operator can control the operation of the machine tool itself or perform teaching operation through depression of a key at the operation unit 52.

FIG. 8B is an enlarged view of the operation unit 52. An operator depresses a shift key 521A or a shift key 521B together with any one of a jog key 522A, a jog key 522B, a jog key 522C, a jog key 522D, a jog key 522E, and a jog key 522F simultaneously to execute jog feed. For example, by depressing the shift key 521A and a "−X key" corresponding to the jog key 522A simultaneously, the machine tool can be moved in a "−X direction" manually. Specifically, the function of a jog key can be enabled only when a shift key and the jog key are depressed together. This is intended to prevent malfunction of the machine tool due to erroneous depression of a jog key with a finger or an object other than a finger.

However, depressing the shift key 521A or 521B and any one of the jog keys 522A to 522F simultaneously while grasping the controller 50 has been a considerably burdensome work on fingers. In some cases, this has caused a health hazard such as tenosynovitis due to long-term use of the controller 50 by an operator.

The present invention is intended to provide a controller for reducing a burden to be imposed on an operator in applying force with a finger during operation on a machine tool or a robot, and for associating an operation history with identification information about the operator.

(1) A first controller (controller 1 described later, for example) according to the present invention is a controller for a robot or a machine tool comprising: a fingerprint detection unit (fingerprint detection unit 11 described later, for example); and a control unit (control unit 13 described later, for example). The control unit comprises: a key information receiving part (key information receiving part 132 described later, for example) that receives input key information; a key information transmission part (key information transition part 131 described later, for example) that transmits the input key information linked in advance with the fingerprint detection unit to the key information receiving part if an operator makes a finger touch the fingerprint detection unit; and an individual identification information specification part (individual identification information specification part 133 described later, for example) that specifies identification information about the operator based on fingerprint information about the finger having touched the fingerprint detection unit.

(2) In the controller described in (1), the control unit (control unit 13 described later, for example) may further comprise a key information determination part (key information determination part 134 described later, for example) that enables the input key information received by the key information receiving part (key information receiving part 132 described later, for example) if the individual identification information specification part (individual identification information specification part 133 described later, for example) has successfully specified identification information for identifying the operator uniquely, and disables the input key information received by the key information receiving part if the individual identification information specification part has failed to specify identification information for identifying the operator uniquely.

(3) The controller (controller 1 described later, for example) described in (1) or (2) may further comprise a display unit (display unit 17 described later, for example) on which a touch panel is superimposed. The fingerprint detection unit (fingerprint detection unit 11 described later, for example) may be provided on the touch panel.

(4) The controller (controller 1 described later, for example) described in (1) to (3) may further comprise a recording unit (recording unit 15 described later, for example). The control unit (control unit 13 described later, for example) may further comprise an operation history storing part (operation history storing part 135 described later, for example) that stores operation history information into the recording unit containing association between the input key information received by the key information receiving part (key information receiving part 132 described later, for example) and the identification information specified by the individual identification information specification part (individual identification information specification part 133 described later, for example).

(5) In the controller described in (4), if the individual identification information specification part (individual identification information specification part 133 described later, for example) has failed to specify identification information for identifying the operator uniquely, the operation history storing part (operation history storing part 135 described later, for example) may not store the operation history information into the recording unit (recording unit 15 described later, for example) containing the association between the input key information received by the key information receiving part (key information receiving part 132 described later, for example) and the identification information specified by the individual identification information specification part.

(6) A second controller (controller 2 described later, for example) according to the present invention is a controller for a robot or a machine tool comprising: a first fingerprint detection unit (first fingerprint detection unit 21 described later, for example); a second fingerprint detection unit (second fingerprint detection unit 22 described later, for example); and a control unit (control unit 23 described later, for example). The control unit comprises: a key information receiving part (key information receiving part 233 described later, for example) that receives first input key information and second input key information; a first key information transmission part (first key information transmission part 231 described later, for example) that transmits the first input key information linked in advance with the first fingerprint detection unit to the key information receiving part while an operator makes a finger touch the first fingerprint detection unit; a second key information transmission part (second key information transmission part 232 described later, for example) that transmits the second input key information linked in advance with the second fingerprint detection unit to the key information receiving part if the operator makes a finger touch the second fingerprint detection unit; a first individual identification information specification part (first individual identification information specification part 234 described later, for example) that specifies identification information about the operator based on fingerprint information about the finger having touched the first fingerprint detection unit; a second individual identification information specification part (second individual identification information specification part 235 described later, for example) that specifies identification information about the operator based on fingerprint information about the finger having touched the second fingerprint detection unit; and an input key determination part (input key determination part 236 described later, for example) that enables the second input key information received by the key information receiving part while the key information receiving part receives the first input key information, and disables the second input key information received by the key information receiving part if the key information receiving part does not receive the first input key information from the first key information transmission part.

(7) In the controller described in (6), the first individual identification information specification part (first individual identification information specification part 234 described later, for example) may specify identification information for uniquely identifying the operator. The second individual identification information specification part (second individual identification information specification part 235 described later, for example) may specify identification information for uniquely identifying the operator. Only if the identification information specified by the first individual identification information specification part and the identification information specified by the second individual identification information specification part agree with each other, the input key determination part (input key determination part 236 described later, for example) may enable the second input key information received by the key information receiving part (key information receiving part 233 described later, for example).

(8) The controller (controller 2 described later, for example) described in (6) or (7) may further comprise a display unit (display unit 27 described later, for example) on which a touch panel is superimposed. The first fingerprint detection unit (first fingerprint detection unit 21 described later, for example) and the second fingerprint detection unit (second fingerprint detection unit 22 described later, for example) may be provided on the touch panel.

(9) The controller (controller 2 described later, for example) described in (6) or (8) may further comprise a recording unit (recording unit 25 described later, for example). The control unit (control unit 23 described later, for example) may further comprise an operation history storing part (operation history storing part 237 described later, for example) that stores operation history information into the recording unit containing association between the second input key information enabled by the input key determination part (input key determination part 236 described later, for example) and the identification information specified by the second individual identification information specification part (second individual identification information specification part 235 described later, for example).

A controller provided by the present invention is capable of reducing a burden to be imposed on an operator in applying force with a finger during operation on a machine tool or a robot, and associating an operation history with identification information about the operator.

BRIEF DESCRIPTION OF THE DRAWINGS

FIG. 3 shows an operation flow to be followed by the controller according to the first embodiment of the present invention;

FIG. 4 shows an operation flow to be followed by the controller according to the first embodiment of the present invention;

FIG. 7 shows an operation flow to be followed by the controller according to the second embodiment of the present invention;

FIG. 8B shows a conventional example of the controller for controlling a machine tool.

DETAILED DESCRIPTION OF THE INVENTION

1. First Embodiment

A first embodiment of the present invention will be described by referring to FIGS. 1 to 4.
[1-1. Configuration of Invention]

Figure 1:
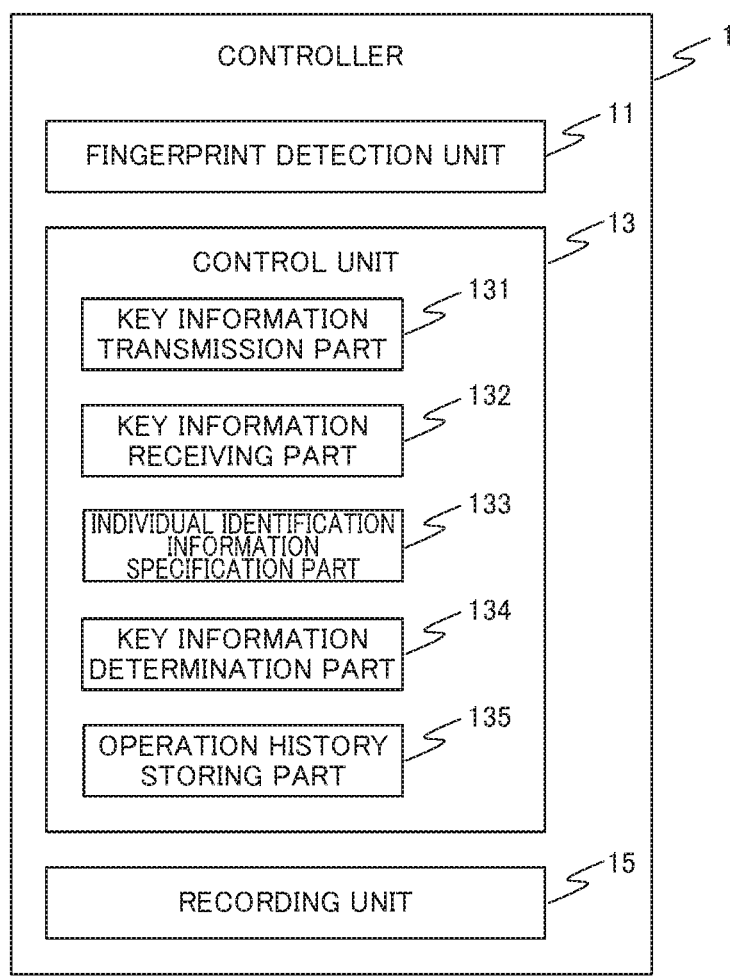
FIG. 1 shows a functional block of a controller according to a first embodiment of the present invention.

FIG. 1 shows an example of the configuration of a controller 1 according to the first embodiment of the present invention. The controller 1 includes a fingerprint detection unit 11, a control unit 13, and a recording unit 15. The control unit 13 includes a key information transmission part 131, a key information receiving part 132, an individual identification information specification part 133, a key information determination part 134, and an operation history storing part 135.

Figure 2A:
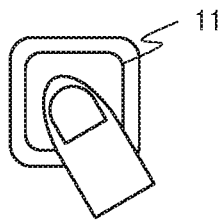
FIG. 2A shows a form of a fingerprint detection unit according to the first embodiment of the present invention.
Figure 2B:
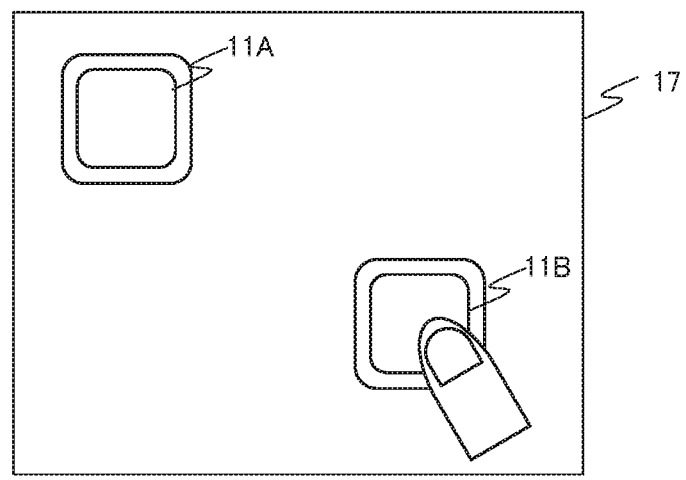
FIG. 2B shows a form of the fingerprint detection unit according to the first embodiment of the present invention.

FIGS. 2A and 2B each show an exemplary form of the fingerprint detection unit 11. The fingerprint detection unit 11 is realized by using a fingerprint detection sensor, for example, and used for detecting a fingerprint of an operator. As shown in FIG. 2A, one fingerprint detection unit 11 may be provided. Alternatively, as shown in FIG. 2B, multiple fingerprint detection units 11 may be provided. In both of the cases where there is one fingerprint detection unit and there are multiple fingerprint detection units, the fingerprint detection unit can be provided as an operation key at an operation unit (not shown in the drawings) in the controller 1. Further, the fingerprint detection unit can be provided on a touch panel superimposed on a display unit 17 in the controller 1. If being provided on the touch panel, the fingerprint detection unit 11 can be set in an arbitrary area on the touch panel.

The control unit 13 includes a CPU, a ROM, a RAM, a CMOS memory, etc. These parts are configured so as to be capable of communicating with each other through a bus and are publicly known for a person skilled in the art.

The CPU is a processor for controlling the controller 1 entirely. The CPU is configured to read a system program and an application program from the ROM through the bus and control the controller 1 entirely by following the read system program and application program, thereby making the control unit 13 fulfill the functions of the key information transmission part 131, the key information receiving part 132, the individual identification information specification part 133, the key information determination part 134, and the operation history storing part 135 as shown in FIG. 1.

If an operator makes a finger touch the fingerprint detection unit 11, the key information transmission part 131 transmits input key information linked in advance with the fingerprint detection unit 11 to the key information receiving part 132 described later. The linkage between the fingerprint detection unit 11 and the input key information can be stored in the recording unit 15 described later, for example. In this case, the key information transmission part 131 is to acquire input key information by reading the linkage from the recording unit 15, and transmit the acquired input key information to the key information receiving part 132.

The key information receiving part 132 receives the input key information from the key information transmission part 131. As described later, the received input key information is enabled or disabled by the key information determination part 134.

The individual identification information specification part 133 specifies identification information about the operator based on fingerprint information about the finger having touched the fingerprint detection unit 11. Fingerprint information and identification information about the operator can be associated with each other and stored in the recording unit 15 described later. Fingerprint information to be registered with the recording unit 15 by a user may be information about any finger. Alternatively, the user may register fingerprint information about a predetermined finger with the recording unit 15. The individual identification information specification part 133 retrieves/acquires identification information from the recording unit 15 by using fingerprint information detected by the fingerprint detection unit 11, thereby specifying identification information about the operator. If the individual identification information specification part 133 has failed to specify identification information about the operator, the individual identification information specification part 133 may assign identification information indicating "unknown operator."

If the individual identification information specification part 133 has successfully specified identification information for identifying the operator uniquely, the key information determination part 134 enables the input key information received by the key information receiving part 132. If the individual identification information specification part 133 has failed to specify identification information for identifying the operator uniquely (specifically, in the case of "unknown operator"), the key information determination part 134 disables the input key information received by the key information receiving part 132.

The operation history storing part 135 stores operation history information into the recording unit 15 described later. The operation history information contains association between the input key information received by the key information receiving part 132 and the identification information specified by the individual identification information specification part 133. If the individual identification information specification part 133 has failed to specify identification information and the key information determination part 134 disables the input key information, the operation history storing part 135 may not store operation history information into the recording unit 15. If the individual identification information specification part 133 has failed to specify identification information and the key information determination part 134 disables the input key information, the operation history storing part 135 may alternatively store operation history information indicating "unknown operator" into the recording unit 15.

The recording unit 15 records the above-described operation history information. Further, as described above, the recording unit 15 can record linkage between the fingerprint detection unit 11 and an input key, fingerprint information and identification information about an operator associated with each other, and identification information indicating that an operator is unknown.

[1.2 Description of Operation]

FIGS. 3 and 4 each show an operation flow to be followed by the controller 1. FIG. 3 shows a first operation flow to be followed by the controller 1.

In step S11, an operator makes a finger touch the fingerprint detection unit 11.

In step S12, the controller 1 authenticates the fingerprint of the finger of the operator having touched the fingerprint detection unit 11. More specifically, the individual identification information specification part 133 attempts to specify identification information about the operator based on fingerprint information about the finger having touched the fingerprint detection unit 11. Further, the key information transmission part 131 transmits input key information linked in advance with the fingerprint detection unit 11 to the key information receiving part 132.

In step S13, if identification information about the operator has been specified successfully (S13: YES), the processing goes to step S14. If identification information about the operator has not been specified successfully (S13: NO), the input key information received by the key information receiving part 132 is disabled. Then, the operation is finished.

In step S14, the controller 1 fulfills the function of a key linked with the fingerprint detection unit 11 touched by the finger. More specifically, the key information determination part 134 enables the input key information received by the key information receiving part 132.

In step S15, the controller 1 registers an operation history. More specifically, the operation history storing part 135 stores operation history information into the recording unit 15 containing association between the input key information received by the key information receiving part 132 and the identification information specified by the individual identification information specification part 133.

The first operation flow to be followed by the controller 1 is as described above. In the first operation flow, if the operator has not been specified successfully, the input key information received by the key information receiving part 132 is disabled. Then, the operation flow is finished.

FIG. 4 shows a second operation flow. In step S21, an operator makes a finger touch the fingerprint detection unit 11.

In step S22, the controller 1 authenticates the fingerprint of the finger of the operator having touched the fingerprint detection unit 11. More specifically, the individual identification information specification part 133 attempts to specify identification information about the operator based on fingerprint information about the finger having touched the fingerprint detection unit 11. Further, the key information transmission part 131 transmits input key information linked in advance with the fingerprint detection unit 11 to the key information receiving part 132.

In step S23, if identification information about the operator has been specified successfully (S23: YES), the processing goes to step S24. If identification information about the operator has not been specified successfully (S23: NO), the processing goes to step S25.

In step S24, the controller 1 fulfills the function of a key linked with the fingerprint detection unit 11 touched by the finger. More specifically, the key information determination part 134 enables the input key information received by the key information receiving part 132.

In step S25, the controller 1 registers an operation history. More specifically, the operation history storing part 135 stores operation history information into the recording unit 15 containing association between the input key information received by the key information receiving part 132 and the identification information specified by the individual identification information specification part 133. If the individual identification information specification part 133 has failed to specify identification information, the operation history storing part 135 stores operation history information into the recording unit 15 containing association between the disabled input key information and identification information indicating that the operator is unknown.

The second operation flow to be followed by the controller 1 is as described above. In the second operation flow, if the operator has not been specified successfully, the operation history storing part 135 stores the operation history information into the recording unit 15 containing association between the input key information received by the key information receiving part 132 and disabled and the identification information indicating that the operator is unknown. Then, the operation flow is finished.

[1.3 Effect Achieved by First Embodiment]

In the first embodiment, a machine tool or a robot can be operated only by touch of the fingerprint detection unit with a finger of an operator. This reduces a burden on the operator in applying force with the finger.

In the first embodiment, the fingerprint detection unit is used as a key for operation on a machine tool or a robot. This makes it possible to prevent work to be done by a disguising action.

In the first embodiment, a result of biological authentication about a fingerprint can easily be associated with operation and an operation history.

Using detection of depression of a push button having a mechanical up and down mechanism or detection of depressing pressure unfortunately permits press of a key at an operation unit with an object other than a finger for operating a machine tool and a robot. In contrast, in the present invention, these detections are replaced by detection of a fingerprint by the fingerprint detection unit. This detection usefully prevents malfunction and ensures safety of an operator.

2. Second Embodiment

A second embodiment of the present invention will be described by referring to FIGS. 5 to 7.

[2-1. Configuration of Invention]

Figure 5:
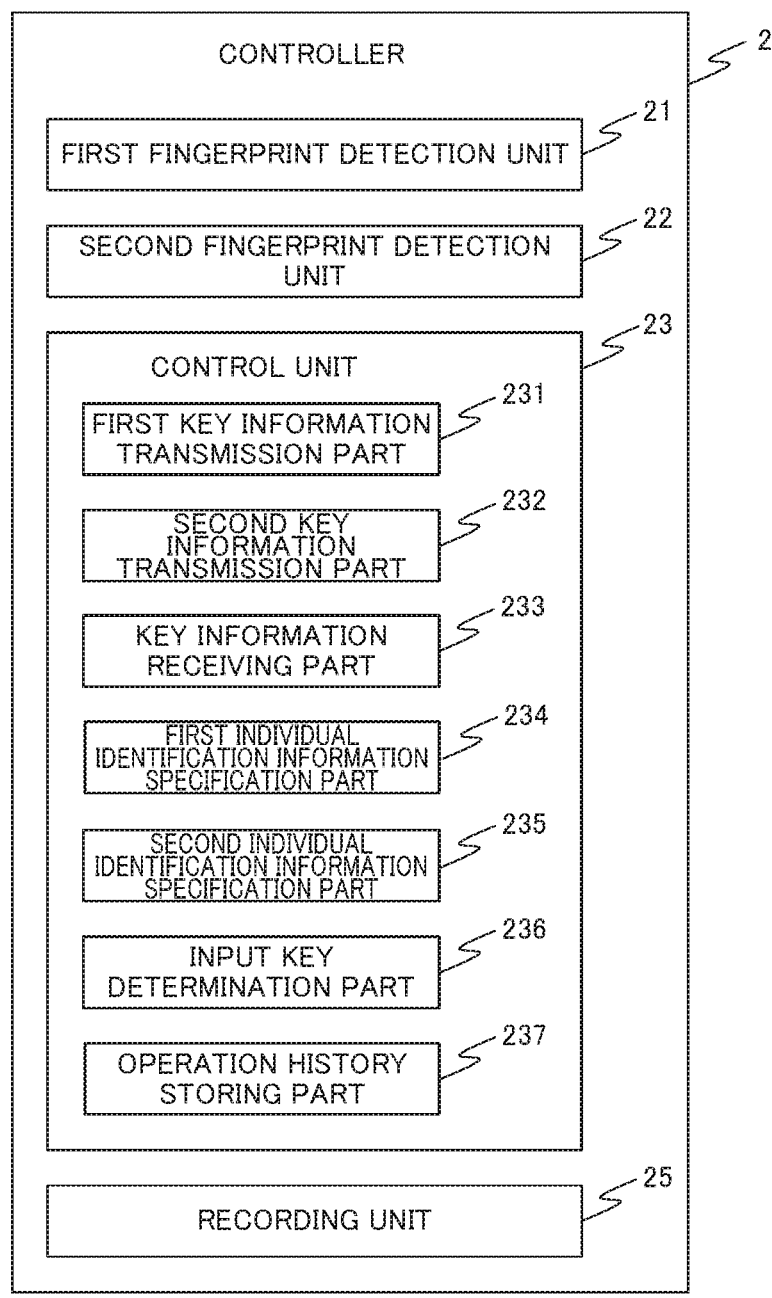
FIG. 5 shows a functional block of a controller according to a second embodiment of the present invention.
Figure 6:
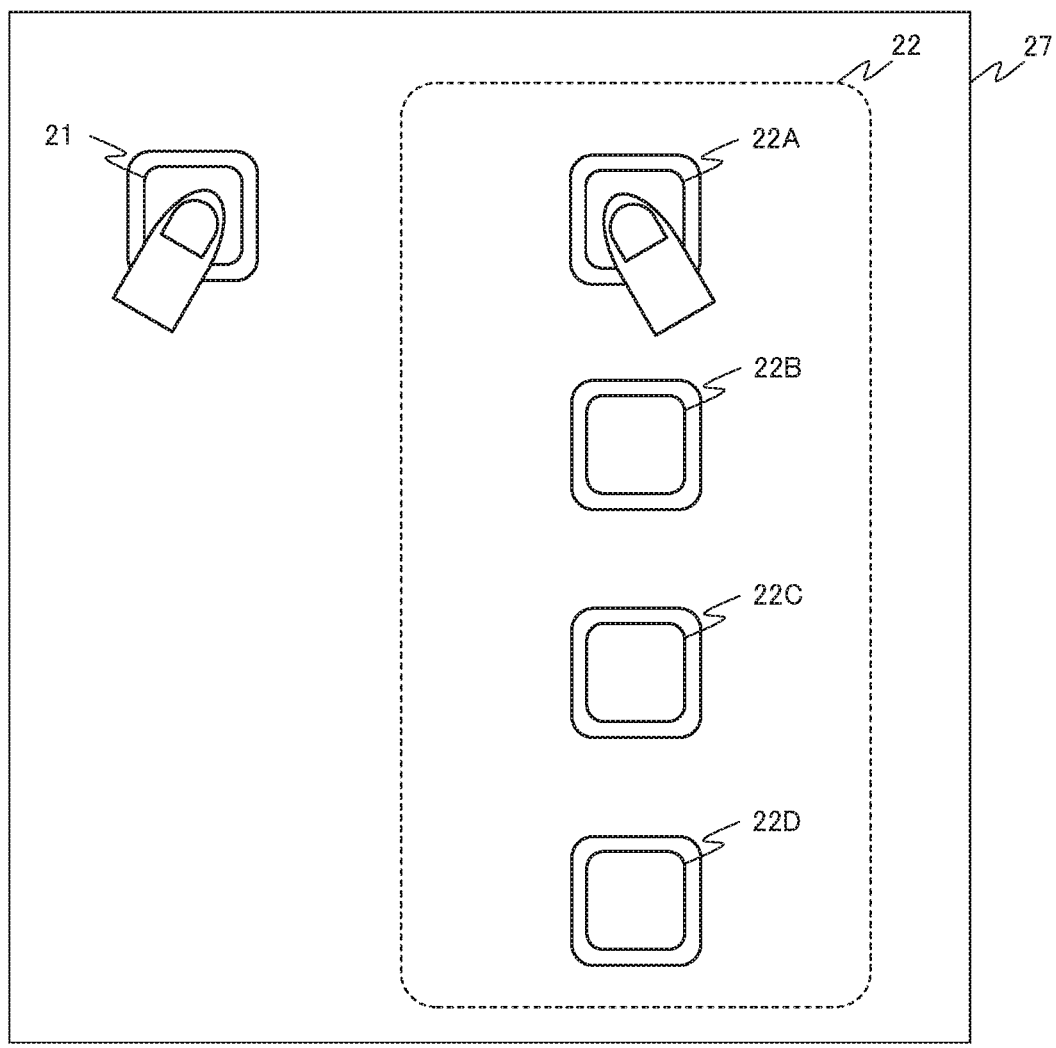
FIG. 6 shows a form of a fingerprint detection unit according to the second embodiment of the present invention.
Figure 8A:
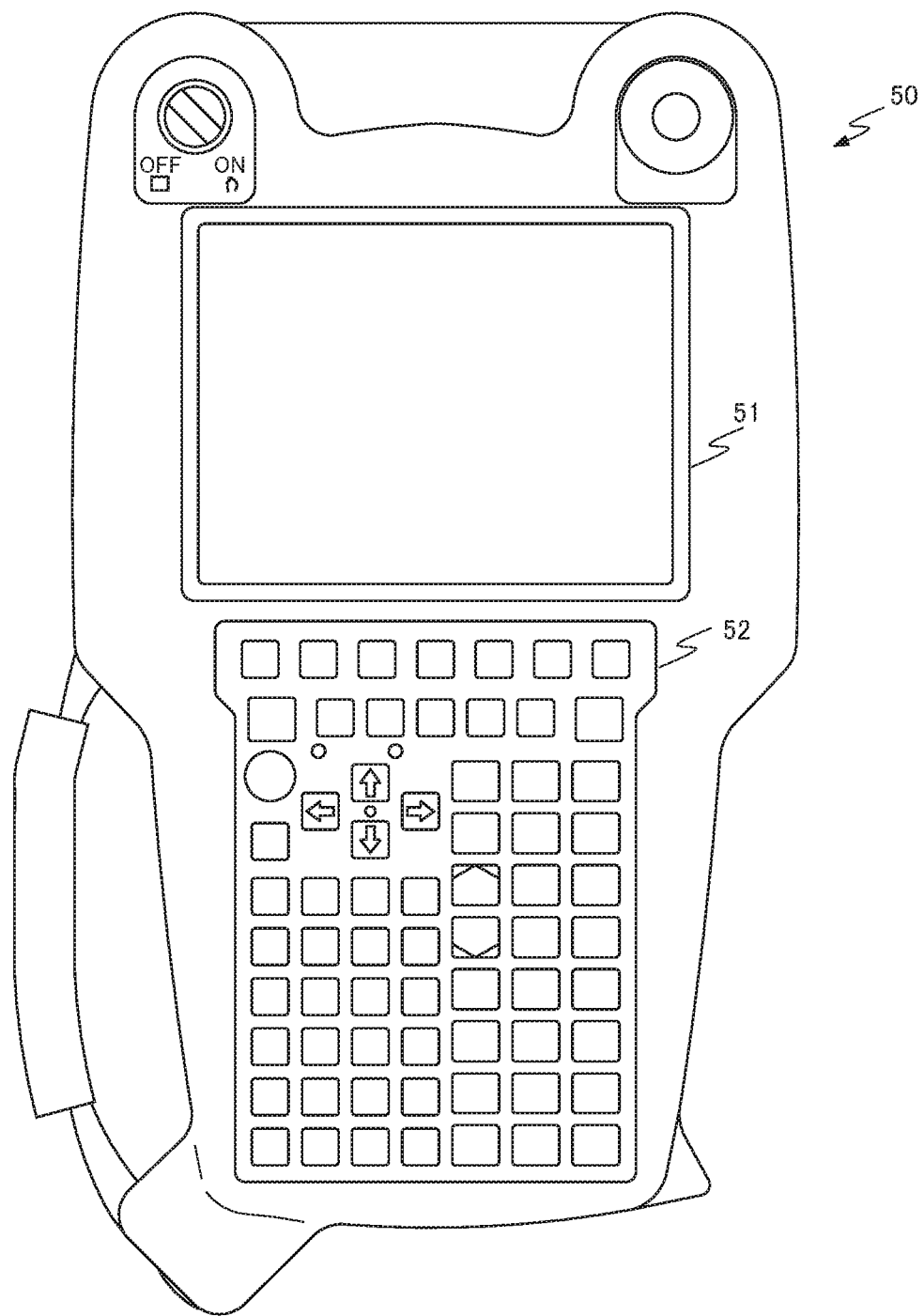
FIG. 8A shows a conventional example of a controller for controlling a machine tool.

FIG. 5 shows an example of the configuration of a controller 2 according to the second embodiment of the present invention. The controller 2 includes a first fingerprint detection unit 21, a second fingerprint detection unit 22, a control unit 23, and a recording unit 25. The control unit 23 includes a first key information transmission part 231, a second key information transmission part 232, a key information receiving part 233, a first individual identification information specification part 234, a second individual identification information specification part 235, an input key determination part 236, and an operation history storing part 237.

The first fingerprint detection unit 21 and the second fingerprint detection unit 22 are each realized by using a fingerprint detection sensor, for example, and used for detecting a fingerprint of an operator. FIG. 6 shows specific examples of the first fingerprint detection unit 21 and the second fingerprint detection unit 22. Referring to FIG. 6, the first fingerprint detection unit 21 and the second fingerprint detection unit 22 are provided on a touch panel superimposed on a display unit 27 in the controller 2.

If an operator wills to fulfill the function of a key linked with any of a second fingerprint detection unit 22A, a second fingerprint detection unit 22B, a second fingerprint detection unit 22C, and a second fingerprint detection unit 22D, the operator is required to touch the first fingerprint detection unit 21 and simultaneously, touch any of the second fingerprint detection units 22A to 22D. By doing so, malfunction by the operator can be prevented more effectively. For example, the first fingerprint detection unit 21 can be a fingerprint detection unit corresponding to a shift key. The second fingerprint detection unit 22A can be a fingerprint detection unit corresponding to a function key (operation start key). The second fingerprint detection units 22B to 22D can be fingerprint detection units corresponding to jog keys.

Like the control unit 13 of the first embodiment, the control unit 23 includes a CPU, a ROM, a RAM, a CMOS memory, etc. These parts are configured so as to be capable of communicating with each other through a bus and are publicly known for a person skilled in the art.

The CPU is a processor for controlling the controller 2 entirely. The CPU is configured to read a system program and an application program from the ROM through the bus and control the controller 2 entirely by following the read system program and application program, thereby making the control unit 23 fulfill the functions of the first key information transmission part 231, the second key information transmission part 232, the key information receiving part 233, the first individual identification information specification part 234, the second individual identification information specification part 235, the input key determination part 236, and the operation history storing part 237, as described in FIG. 5.

If an operator makes a finger touch the first fingerprint detection unit 21, the first key information transmission part 231 transmits input key information linked in advance with the first fingerprint detection unit 21 to the key information receiving part 233 described later. The linkage between the first fingerprint detection unit 21 and the input key information can be stored in the recording unit 25 described later, for example. In this case, the first key information transmission part 231 is to acquire input key information by reading the linkage from the recording unit 25, and transmit the acquired input key information to the key information receiving part 233.

If the operator makes a finger touch the second fingerprint detection unit 22, the second key information transmission part 232 transmits input key information linked in advance with the second fingerprint detection unit 22 to the key information receiving part 233 described later. The linkage between the second fingerprint detection unit 22 and the input key information can be stored in the recording unit 25 described later, for example. In this case, the second key information transmission part 232 is to acquire input key information by reading the linkage from the recording unit 25, and transmit the acquired input key information to the key information receiving part 233.

The key information receiving part 233 receives the input key information from the first key information transmission part 231 and the input key information from the second key information transmission part 232. As described later, each received input key information is enabled or disabled by the input key determination part 236.

The first individual identification information specification part 234 specifies identification information about the operator based on fingerprint information about the finger having touched the first fingerprint detection unit 21. Fingerprint information and identification information about the operator can be associated with each other and stored in the recording unit 25 described later. Fingerprint information to be registered with the recording unit 25 by a user may be information about any finger. Alternatively, the user may register fingerprint information about a predetermined finger with the recording unit 25. The first individual identification information specification part 234 retrieves/acquires identification information from the recording unit 25 by using fingerprint information detected by the first fingerprint detection unit 21, thereby specifying identification information about the operator.

The second individual identification information specification part 235 specifies identification information about the operator based on fingerprint information about the finger having touched the second fingerprint detection unit 22. Fingerprint information and identification information about the operator can be associated with each other and stored in the recording unit 25 described later. Fingerprint information to be registered with the recording unit 25 by a user may be information about any finger. Alternatively, the user may register fingerprint information about a predetermined finger with the recording unit 25. The second individual identification information specification part 235 retrieves/acquires identification information from the recording unit 25 by using fingerprint information detected by the second fingerprint detection unit 22, thereby specifying identification information about the operator.

While the key information receiving part 233 receives first input key information, the input key determination part 236 enables second input key information received by the key information receiving part 233. If the key information receiving part 233 does not receive first input key information from the first key information transmission part 231, the input key determination part 236 disables second input key information received by the key information receiving part 233.

The operation history storing part 237 stores operation history information into the recording unit 25 described later. The operation history information contains association between the second input key information enabled by the input key determination part 236 and the identification information specified by the second individual identification information specification part 235.

The recording unit 25 records the above-described operation history information. Further, the recording unit 25 can record linkage between the first fingerprint detection unit 21 and an input key, linkage between the second fingerprint detection unit 22 and an input key, fingerprint information and identification information about an operator associated with each other, and identification information indicating that an operator is unknown.

[2.2 Description of Operation]

FIG. 7 shows an operation flow to be followed by the controller 2. In step S31, an operator makes a finger touch the first fingerprint detection unit 21.

In step S32, the controller 2 authenticates the fingerprint of the finger of the operator having touched the first fingerprint detection unit 21. More specifically, the first individual identification information specification part 234 attempts to specify identification information about the operator based on fingerprint information about the finger having touched the first fingerprint detection unit 21. Further, the first key information transmission part 231 transmits first input key information linked in advance with the first fingerprint detection unit 21 to the key information receiving part 233.

In step S33, the operator makes a finger touch the second fingerprint detection unit 22. In step S34, if the touch of the finger of the operator with the second fingerprint detection unit 22 coincides with the touch of the finger of the operator with the first fingerprint detection unit 21 (S34: YES), the processing goes to step S35. If the touch of the finger of the operator with the second fingerprint detection unit 22 does not coincide with the touch of the finger of the operator with the first fingerprint detection unit 21 (S34: NO), the operation flow is finished.

In step S35, the controller 2 authenticates the fingerprint of the finger of the operator having touched the second fingerprint detection unit 22. More specifically, the second individual identification information specification part 235 attempts to specify identification information about the operator based on fingerprint information about the finger having touched the second fingerprint detection unit 22. Further, the second key information transmission part 232 transmits second input key information linked in advance with the second fingerprint detection unit 22 to the key information receiving part 233.

In step S36, if identification information about the operator has been specified successfully (S36: YES), the processing goes to step S37. More specifically, if the identification information specified by the first individual identification information specification part 234 and the identification information specified by the second individual identification information specification part 235 agree with each other, it is determined that the identification information about the operator has been specified successfully. If identification information about the operator has been specified successfully (S36: NO), the operation flow is finished.

In step S37, the controller 2 fulfills the function of a key linked with the second fingerprint detection unit 22 touched by the finger. More specifically, the input key determination part 236 enables the second input key information received by the key information receiving part 233.

In step S38, the controller 2 registers an operation history. More specifically, the operation history storing part 237 stores operation history information into the recording unit 25 containing association between the second input key information received by the key information receiving part 233 and the identification information specified by the second individual identification information specification part 235. The operation flow to be followed by the controller 2 is as described above.

[2.3 Effect Achieved by Second Embodiment]

The controller 2 according to the second embodiment achieves effect comparable to that achieved by the controller 1 according to the first embodiment. Further, in the second embodiment, unless fingerprints are detected by the first fingerprint detection unit 21 and the second fingerprint detection unit 22, operation is not performed. This prevents malfunction and ensures safety of an operator more effectively.

3. Modifications

In the first and second embodiments, even if an operator has not been specified successfully, the key information determination part 134 or the input key determination part 236 may enable input key information. Then, the operation history storing part 135 or 237 may store an operation history indicating "unknown operator" into the recording unit 15 or 25.

In each of the operation flows of the first and second embodiments, an attempt is made only once to authenticate a fingerprint on each fingerprint detection unit. Alternatively, several attempts may be made. Specifically, each time authentication of a fingerprint ends in failure, processing may return to an initial step of an operation flow. If authentication of the fingerprint still ends in failure even after attempts are made a predetermined number of times, an operator may be determined to be unknown and the operation flow may be continued.

In the first and second embodiments, based on failure to authenticate a fingerprint as a trigger, the key information determination part 134 or the input key determination part 236 may disable input key information. Then, an operation flow may be finished.

In the first and second embodiments, even if fingerprint authentication ends in failure, the key information receiving part 132 or 233 may enable input key information. Then, the operation history storing part 135 or 237 may store an operation history indicating "unknown operator" into the recording unit 15 or 25. Alternatively, the key information receiving part 132 or 233 may disable the input key information. Then, the operation history storing part 135 or 237 may store only an operation history indicating "unknown operator" into the recording unit 15 or 25.

In the second embodiment, the operation history storing part 237 may store operation history information containing association between first input key information enabled by the input key determination part 236 and identification information specified by the first individual identification information specification part 234 into the recording unit 25, in addition to operation history information containing association between second input key information enabled by the input key determination part 236 and identification information specified by the second individual identification information specification part 235.

In the second embodiment, if the second individual identification information specification part 235 has failed to specify identification information, the operation history storing part 237 may store an operation history indicating that an operator is unknown into the recording unit 25, like in the first embodiment.

In a modification of the second embodiment, if identification information specified by the first individual identification information specification part 234 and identification information specified by the second individual identification information specification part 235 do not agree with each other, the operation history storing part 237 may store an operation history into the recording unit 25 indicating that operations have been performed by two operators.

In the second embodiment, the function of a key linked with the second fingerprint detection unit 22 corresponding to a function key or a jog key may be enabled only if a finger to touch the first fingerprint detection unit 21 corresponding to a shift key is a finger of a particular type.

In the second embodiment, the function of a key linked with the second fingerprint detection unit 22 for starting operation or executing action of a particular axis may be enabled only if a finger to touch the first fingerprint detection unit 21 for permitting the operation is a left finger and a finger to touch the second fingerprint detection unit 22 is a right finger. Alternatively, the function of a key linked with the second fingerprint detection unit 22 for starting operation or executing action of a particular axis may be enabled only if a finger to touch the first fingerprint detection unit 21 for permitting the operation is a right finger and a finger to touch the second fingerprint detection unit 22 is a left finger. In this way, the relationship between a left hand and a right hand may be reversed.

In a modification, a right hand or a left hand to be used for authentication, and a finger to be used for the authentication, may be determined in advance.

For registration of a fingerprint, a user may register the fingerprint of any finger.

In each of the above-described embodiments, a method implemented by the controllers 1 and 2 for controlling a machine tool or a robot is realized by software. To realize the control method by software, programs constituting this software are installed on a computer (controllers 1 and 2). These programs may be stored in a removable medium and distributed to a user. Alternatively, these programs may be distributed to the user by being downloaded onto a computer of the user through a network.

EXPLANATION OF REFERENCE NUMERALS

1, 2 Controller
11 Fingerprint detection unit
13, 23 Control unit
15, 25 Recording unit
21 First fingerprint detection unit
22 Second fingerprint detection unit
131, 231 Key information transmission part
132 Key information receiving part
133 Individual identification information specification part
134 Key information determination part
135 Operation history storing part
231 First key information transmission part
232 Second key information transmission part
233 Key information receiving part
234 First individual identification information specification part
235 Second individual identification information specification part
236 Input key determination part
237 Operation history storing part

What is claimed is:

1. A controller for a robot or a machine tool, the controller comprising:
    an input key including a fingerprint detection unit to be touched by a finger of an operator, the fingerprint detection unit having input key information linked in advance therewith, and the input key having a respective function associated therewith; and
    a control unit, wherein
    the control unit comprises:
    a key information transmission part that transmits the input key information if the operator touches the fingerprint detection unit;
    a key information receiving part that receives the input key information from the key information transmission part; and
    an individual identification information specification part that determines whether fingerprint information of a finger that has touched the fingerprint detection unit matches stored operator identification information; and
    a key information determination part that:
        enables the input key information and the function associated with the input key if the individual identification information specification part has determined that the fingerprint information matches stored operator identification information, and
        disables the input key information and the function associated with the input key if the individual identification information specification part has failed to determine that the fingerprint information matches stored operator identification information.

2. The controller according to claim 1, further comprising:
    a display unit on which a touch panel is superimposed, wherein
    the fingerprint detection unit is provided on the touch panel.

3. The controller according to claim 1, further comprising:
    a recording unit, wherein
    the control unit further comprises:
    an operation history storing part that stores operation history information into the recording unit containing association between the input key information received by the key information receiving part and the identification information determined by the individual identification information specification part.

4. The controller according to claim 3, wherein
    if the individual identification information specification part has failed to determine that the fingerprint information matches stored operator identification information, the operation history storing part does not store the operation history information into the recording unit containing the association between the input key information received by the key information receiving part and the identification information specified by the individual identification information specification part.

5. A controller for a robot or a machine tool, the controller comprising:
    a first input key including a first fingerprint detection unit to be touched by a finger of an operator, the first fingerprint detection unit having first input key information linked in advance therewith, and the first input key having a respective function associated therewith;

a second input key including a second fingerprint detection unit to be touched by another finger of the operator, the second fingerprint detection unit having second input key information linked in advance therewith, and the second input key having a respective function associated therewith; and a control unit, wherein the control unit comprises:

a first key information transmission part that transmits the first input key information while the operator touches the first fingerprint detection unit;

a second key information transmission part that transmits the second input key information if the operator touches the second fingerprint detection unit;

a key information receiving part that receives the first input key information and the second input key information;

a first individual identification information specification part that determines whether fingerprint information of a finger that has touched the first fingerprint detection unit matches stored operator identification information;

a second individual identification information specification part that determines whether fingerprint information of a finger that has touched the second fingerprint detection unit matches stored operator identification information; and an input key determination part that enables the second input key information received by the key information receiving part while the key information receiving part receives the first input key information, and disables the second input key information received by the key information receiving part and the function associated with the second input key if the key information receiving part does not receive the first input key information from the first key information transmission part.

6. The controller according to claim 5, wherein only if the operator identification information determined by the first individual identification information specification part and the operator identification information determined by the second individual identification information specification part agree with each other, the input key determination part enables the second input key information received by the key information receiving part and the function associated with the second input key.

7. The controller according to claim 5, further comprising:

a display unit on which a touch panel is superimposed, wherein the first fingerprint detection unit and the second fingerprint detection unit are provided on the touch panel.

8. The controller according to claim 5, further comprising:

a recording unit, wherein the control unit further comprises:

an operation history storing part that stores operation history information into the recording unit containing association between the second input key information enabled by the input key determination part and the identification information determined by the second individual identification information specification part.

* * * * *